US009491192B2

(12) United States Patent
Antunes

(10) Patent No.: US 9,491,192 B2
(45) Date of Patent: Nov. 8, 2016

(54) UNIVERSAL RELATIONSHIPS, SYSTEM AND METHOD TO BUILD AND OPERATE A REPOSITORY TO MANAGE AND SHARE TRUSTED INFORMATION OF ENTITIES AND THEIR RELATIONSHIPS

(71) Applicant: Marcio Veloso Antunes, Cabo Frio (BR)

(72) Inventor: Marcio Veloso Antunes, Cabo Frio (BR)

(*) Notice: Subject to any disclaimer, the term of this patent is extended or adjusted under 35 U.S.C. 154(b) by 58 days.

(21) Appl. No.: 14/325,379

(22) Filed: Jul. 8, 2014

(65) Prior Publication Data
US 2016/0014109 A1 Jan. 14, 2016

(51) Int. Cl.
*H04L 29/06* (2006.01)
(52) U.S. Cl.
CPC ....... *H04L 63/1441* (2013.01); *H04L 63/0884* (2013.01)

(58) Field of Classification Search
None
See application file for complete search history.

(56) References Cited

U.S. PATENT DOCUMENTS

| | | | | | |
|---|---|---|---|---|---|
| 5,892,900 | A * | 4/1999 | Ginter | ............... | G06F 21/10 726/26 |
| 6,052,709 | A * | 4/2000 | Paul | ............... | G06Q 10/107 709/202 |
| 6,615,258 | B1 * | 9/2003 | Barry | ............... | G06F 11/0709 707/E17.107 |
| 6,691,156 | B1 * | 2/2004 | Drummond | ............... | G06Q 10/107 709/203 |
| 6,704,873 | B1 * | 3/2004 | Underwood | ............... | H04L 63/02 709/223 |
| 6,779,021 | B1 * | 8/2004 | Bates | ............... | G06Q 10/107 707/999.006 |
| 8,402,557 | B2 * | 3/2013 | Ginter | ............... | G06F 21/10 705/50 |
| 8,583,915 | B1 * | 11/2013 | Huang | ............... | H04L 63/0869 713/155 |
| 2003/0225841 | A1 * | 12/2003 | Song | ............... | H04L 51/12 709/206 |
| 2004/0255137 | A1 * | 12/2004 | Ying | ............... | H04L 63/0442 713/193 |
| 2006/0253458 | A1 * | 11/2006 | Dixon | ............... | G06Q 30/02 707/999.01 |
| 2009/0254971 | A1 * | 10/2009 | Herz | ............... | G06Q 10/10 726/1 |
| 2010/0199089 | A1 * | 8/2010 | Vysogorets | ............... | G06F 21/34 713/168 |
| 2013/0179988 | A1 * | 7/2013 | Bekker | ............... | H04L 63/0823 726/27 |
| 2013/0268357 | A1 * | 10/2013 | Heath | ............... | H04L 63/00 705/14.53 |
| 2015/0012339 | A1 * | 1/2015 | Onischuk | ............... | G07C 13/00 705/12 |

OTHER PUBLICATIONS

Ezovski, G. Matthew; Watkins, Steve E. The Electronic Passport and the Future of Government-Issued RFID-Based Identification. 2007 IEEE International Conference on RFID. http://ieeexplore.ieee.org/stamp/stamp.jsp?arnumber=4143505.*

(Continued)

*Primary Examiner* — Jeremiah Avery

(57) ABSTRACT

A computer system that registers entities, their relationship, and information related to the relationship. The related information is maintained only by its issuer and read access may be given to related entities. One entity can share with other entities the read access to information granted to it through the relationships it establishes with other entities. When an entity shares information, it gives another entity read access to the information at its source, maintained only by its issuer, without changes. For example, an entity shares its phone number and educational background with some company. The company entity may access all information shared by the entity, and can be sure the information is reliable since it is maintained and shared by its issuer. The phone number will be informed by the phone company and educational background information by each educational institute related to the entity that shared the information.

1 Claim, 17 Drawing Sheets

(56) References Cited

OTHER PUBLICATIONS

Figure 1:
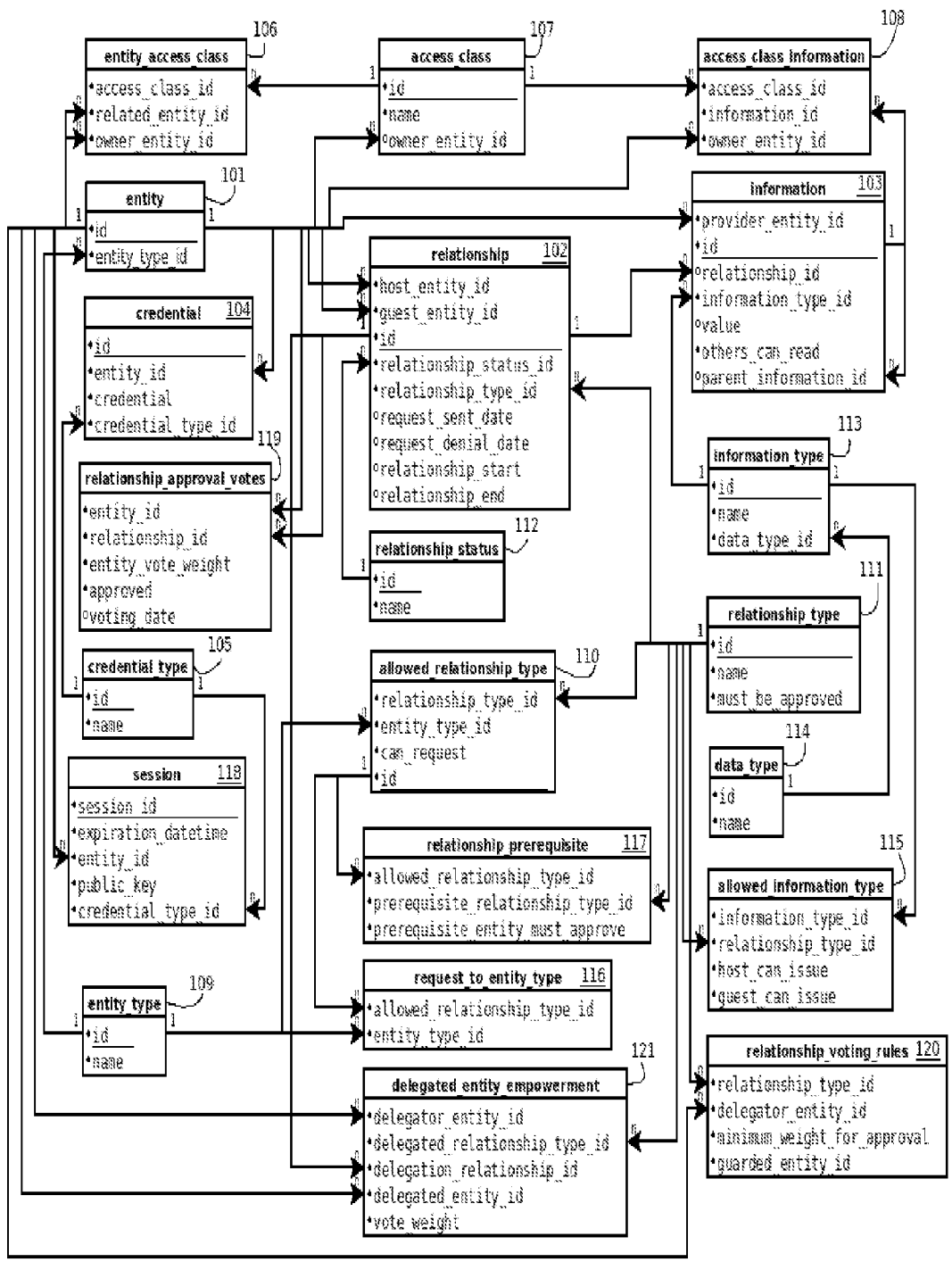

Jensen, Jostein. Federated Identity Management Challenges. 2012 Seventh International Conference on Availability, Reliability and Security (ARES). http://ieeexplore.ieee.org/stamp/stamp.jsp?arnumber=6329187.*

Lampathaki, Fenareti; Kroustalias, Nikos; Koussouris, Sotiris; Charalabidis, Yannis; Psarras, John. Implementing Interoperability Infrastructures: Issues and Challenges from the Citizens' Base Registry in Greece. 2010 43rd Hawaii International Conference on System Sciences. http://ieeexplore.ieee.org/stamp/stamp.jsp?arnumber=5428278.*

Salas, Percy E. Rivera; Martin, Michael; Da Mota, Fernando Maia; Auer, Soren; Breitman, Karin K.; Casanova, Marco A. OLAP2DataCube: An Ontowiki Plug-In for Statistical Data Publishing. 2012 2nd Workshop on Developing Tools as Plug-ins (TOPI). http://ieeexplore.ieee.org/stamp/stamp.jsp?arnumber=6229815.*

\* cited by examiner

FIG. 1A entity_type

| id (1A01) | name (1A02) |
|---|---|
| 1 | Person |
| 2 | Company |
| 3 | Government |
| 4 | University |
| 5 | Institute |

109 relationship_type

| id (1A03) | name (1A04) | must_be_approved (1A05) |
|---|---|---|
| 1 | Public contact | FALSE |
| 2 | Contact | TRUE |
| 3 | Citizenship | TRUE |
| 4 | Matrimonial | TRUE |
| 5 | Education | TRUE |
| 6 | Employment | TRUE |
| 7 | Delegation | TRUE |
| 8 | Legal Guardian | FALSE |
| 9 | Degree-granting license | TRUE |

111 credential_type

| id (1A06) | name (1A07) |
|---|---|
| 1 | Unencrypted Password |
| 2 | MD5 Password |
| 3 | RSA key |

105 relationship_status

| id (1A08) | name (1A09) |
|---|---|
| 1 | Requested |
| 2 | Active |
| 3 | Denied |
| 4 | Ended |
| 5 | Under regulator approval |
| 6 | Under legal responsible approval |

112

FIG. 1B

| id | name | data_type_id |
|---|---|---|
| 1 | Name | 3 |
| 2 | Sex | 3 |
| 3 | birthdate | 6 |
| 4 | Social Security Number | 7 |
| 5 | Phone number | 8 |
| 6 | e-mail | 9 |
| 7 | father's name | 3 |
| 8 | mother's name | 3 |
| 9 | course name | 3 |
| 10 | title granted | 3 |
| 11 | when we met | 3 |
| 12 | where we met | 3 |
| 13 | free text | 4 |
| 14 | Date of Creation | 6 |
| 15 | Job title | 3 |
| 16 | Represented entity ID | 10 |
| 17 | Delegated Relationship Type ID | 11 |
| 18 | sub-delegation allowed | 12 |
| 19 | Delegated Entity ID | 10 |
| 20 | maiden name | 3 |
| 21 | Wedding date | 6 |
| 22 | Matrimonial regime | 3 |
| 23 | Degree-granting License Number | 3 | information_type

| id | name |
|---|---|
| 1 | integer |
| 2 | real |
| 3 | string |
| 4 | text |
| 5 | binary |
| 6 | date/time |
| 7 | Social Security Number |
| 8 | E164 phone number |
| 9 | E-Mail |
| 10 | Entity ID |
| 11 | Relationship Type ID |
| 12 | boolean | data_type

FIG. 1C allowed_relationship_type (110)

| id | relationship_type_id | can_request | entity_type_id |
|---|---|---|---|
| 17 | 1 | TRUE | 1 |
| 18 | 2 | TRUE | 1 |
| 19 | 3 | TRUE | 3 |
| 20 | 4 | TRUE | 1 |
| 21 | 5 | TRUE | 4 |
| 22 | 6 | TRUE | 2 |
| 23 | 7 | TRUE | 3 |
| 24 | 8 | FALSE | 1 |
| 25 | 9 | TRUE | 4 | request_to_entity_type (116)

| allowed_relationship_type_id | entity_type_id |
|---|---|
| 17 | 1 |
| 18 | 1 |
| 21 | 1 |
| 22 | 1 |
| 23 | 1 |
| 24 | 1 |
| 19 | 1 |
| 20 | 1 |
| 18 | 2 |
| 19 | 2 |
| 25 | 3 |
| 19 | 4 | relationship_prerequisite (117)

| allowed_relationship_type_id | prerequisite_relationship_type_id | prerequisite_entity_must_approve |
|---|---|---|
| 20 | 3 | TRUE |
| 21 | 8 | FALSE |
| 24 | 3 | TRUE |
| 25 | 3 | FALSE | relationship_approval_votes (119)

| entity_id | relationship_id | entity_vote_weight | approved | voting_date |
|---|---|---|---|---|
| 7 | 5 | 1 | TRUE | 2013-06-18 19:35:00-03 | relationship_voting_rules (120)

| relationship_type_id | delegator_entity_id | minimum_weight_for_approval | awarded_entity_id |
|---|---|---|---|
| 3 | 1 | 1 | |
| 4 | 1 | 1 | | delegated_entity_empowerment (121)

| delegator_entity_id | delegated_relationship_type_id | delegation_relationship_id | delegated_entity_id | vote_weight |
|---|---|---|---|---|
| 1 | 3 | 2 | 7 | 1 |
| 1 | 4 | 2 | 7 | 1 |

FIG. 1D

FIG. 1F

| id | rowess | relation | inform | value | others | parent_id |
|----|--------|----------|--------|-------|--------|-----------|
| 1 | ⇒1 | NULL | ⇒1 | Government of United States of America | TRUE | NULL |
| 2 | ⇒1 | ⇒1 | ⇒1 | Michael Brown Campbell | TRUE | NULL |
| 3 | ⇒1 | ⇒1 | ⇒2 | Male | TRUE | NULL |
| 4 | ⇒1 | ⇒1 | ⇒3 | 1954-04-04 08:20:00 EST | TRUE | NULL |
| 5 | ⇒1 | ⇒1 | ⇒4 | 987-65-4320 | TRUE | NULL |
| 6 | ⇒1 | ⇒2 | ⇒16 | 1 | TRUE | NULL |
| 7 | ⇒1 | ⇒2 | ⇒17 | 3 | TRUE | NULL |
| 8 | ⇒1 | ⇒2 | ⇒17 | 4 | TRUE | NULL |
| 9 | ⇒1 | ⇒2 | ⇒18 | FALSE | TRUE | NULL |
| 22 | ⇒1 | ⇒3 | ⇒1 | Christopher Taylor Williams | TRUE | NULL |
| 23 | ⇒1 | ⇒3 | ⇒2 | Male | TRUE | NULL |
| 24 | ⇒1 | ⇒3 | ⇒3 | 1969-01-04 13:45:00 | TRUE | NULL |
| 25 | ⇒1 | ⇒3 | ⇒4 | 987-65-4321 | TRUE | NULL |
| 27 | ⇒1 | ⇒4 | ⇒2 | Female | TRUE | NULL |
| 28 | ⇒1 | ⇒4 | ⇒3 | 1973-01-01 01:20:00 | TRUE | NULL |
| 29 | ⇒1 | ⇒4 | ⇒4 | 987-65-4322 | TRUE | NULL |
| 34 | ⇒1 | ⇒3 | ⇒19 | 7 | TRUE | NULL |
| 35 | ⇒1 | ⇒4 | ⇒19 | 7 | TRUE | NULL |
| 42 | ⇒1 | ⇒7 | ⇒1 | Nicholas Jones Williams | TRUE | NULL |
| 43 | ⇒1 | ⇒7 | ⇒2 | Male | TRUE | NULL |
| 44 | ⇒1 | ⇒7 | ⇒3 | 2007-01-07 08:20:00 | TRUE | NULL |
| 45 | ⇒1 | ⇒7 | ⇒4 | 987-65-4323 | TRUE | NULL |
| 46 | ⇒1 | ⇒7 | ⇒19 | 7 | TRUE | NULL |
| 47 | ⇒1 | ⇒4 | ⇒20 | Emily Patel Jones | TRUE | NULL |
| 26 | ⇒1 | ⇒4 | ⇒1 | Emily Jones Williams | TRUE | NULL |
| 48 | ⇒1 | ⇒5 | ⇒21 | 2005-12-07 17:00:00 | TRUE | NULL |
| 49 | ⇒1 | ⇒5 | ⇒22 | limited community of property | TRUE | NULL |
| 50 | ⇒1 | ⇒13 | ⇒1 | Massachusetts Institute of Technology and Boston ... | TRUE | NULL |
| 51 | ⇒1 | ⇒14 | ⇒23 | 216531-2656/47 | TRUE | NULL |
| 52 | ⇒2 | ⇒6 | ⇒9 | Computer Science | TRUE | NULL |
| 53 | ⇒2 | ⇒6 | ⇒10 | Bachelor of Science in Computer Science and Engin.. | TRUE | NULL |
| 54 | ⇒2 | NULL | ⇒5 | 617-253-1000 | TRUE | NULL |
| 55 | ⇒1 | ⇒15 | ⇒1 | ACME Computers | TRUE | NULL |
| 56 | ⇒3 | NULL | ⇒5 | +55.21.3000.0001 | TRUE | NULL |
| 58 | ⇒3 | NULL | ⇒6 | clients@example.com | TRUE | NULL |
| 60 | ⇒4 | NULL | ⇒5 | +55.21.99990005 | TRUE | NULL |
| 61 | ⇒6 | NULL | ⇒5 | +55.21.99990006 | TRUE | NULL |
| 59 | ⇒3 | ⇒8 | ⇒15 | Director of Technology | TRUE | NULL |
| 62 | ⇒4 | NULL | ⇒5 | +55.21.8888.0252 | TRUE | NULL |
| 57 | ⇒3 | NULL | ⇒6 | christopher@example.com | TRUE | NULL | information

FIG. 1G

| session_id (1G01) | expiration_datetime (1G02) | entity_id (1G03) | public_key (1G04) | credential_type_id (1G05) |
|---|---|---|---|---|
| 701626f8512e3d... | 2013-06-18 21:39:00-03 | 7 | 3a066df1cd2ef... | 3 |
| 9de0ee59078b5... | 2013-06-18 21:42:15-03 | 4 | ea672e2e7759... | 2 |

118

FIG. 1H

| entity_name | access_class | related_entity | |
|---|---|---|---|
| Christopher Taylor Williams | Business | Massachusetts Institute of Technology and Boston Society of Natural History | |
| Christopher Taylor Williams | Business | ACME Computers | |
| Christopher Taylor Williams | Family | Emily Jones Williams | |
| Christopher Taylor Williams | Family | Nicholas Jones Williams | |
| Christopher Taylor Williams | Public | Government of United States of America | |
| Christopher Taylor Williams | Public | Massachusetts Institute of Technology and Boston Society of Natural History | 1H14 | related entity X access class

| entity_name | relationship | info_type | info_value | related_entity | info_provider_entity | |
|---|---|---|---|---|---|---|
| Christopher T... | Citizenship | Delegated Entity ID | 7 | Government of Uni... | Government of United States of America | |
| Christopher T... | Citizenship | Name | Christopher Taylor Williams | Government of Uni... | Government of United States of America | |
| Christopher T... | Citizenship | Sex | Male | Government of Uni... | Government of United States of America | |
| Christopher T... | Citizenship | Social Security Number | 987-65-4321 | Government of Uni... | Government of United States of America | |
| Christopher T... | Citizenship | birthdate | 1969-01-04 13:45:00 | Government of Uni... | Government of United States of America | |
| Christopher T... | Education | course name | Computer Science | Massachusetts Inst... | Massachusetts Institute of Technology | |
| Christopher T... | Education | title granted | Bachelor of Science in Com... | Massachusetts Inst... | Massachusetts Institute of Technology ... | |
| Christopher T... | Employment | Job title | Director of Technology | ACME Computers | ACME Computers | |
| Christopher T... | Matrimonial | Matrimonial regime | limited community of property | Emily Jones Williams | Government of United States of America | |
| Christopher T... | Matrimonial | Wedding date | 2005-12-07 17:00:00 | Emily Jones Williams | Government of United States of America | |
| Christopher T... | NULL | Phone number | +55 21 99990005 | NULL | Christopher Taylor Williams | |
| Christopher T... | NULL | Phone number | +55 21 6666 0252 | NULL | Christopher Taylor Williams | 1H15 | shared relationship information X provider entity

| entity_name | access_class | information_type | information | |
|---|---|---|---|---|
| Christopher Taylor Williams | Business | Phone number | +55 21 8888 0252 | |
| Christopher Taylor Williams | Business | birthdate | 1969-01-04 13:45:00 | |
| Christopher Taylor Williams | Business | Social Security Number | 987-65-4321 | |
| Christopher Taylor Williams | Business | title granted | Bachelor of Science in Computer Science and Engineering | |
| Christopher Taylor Williams | Business | Name | Christopher Taylor Williams | |
| Christopher Taylor Williams | Business | course name | Computer Science | |
| Christopher Taylor Williams | Business | Job title | Director of Technology | |
| Christopher Taylor Williams | Business | Sex | Male | |
| Christopher Taylor Williams | Family | Phone number | +55 21 99990005 | |
| Christopher Taylor Williams | Family | birthdate | 1969-01-04 13:45:00 | |
| Christopher Taylor Williams | Family | Social Security Number | 987-65-4321 | |
| Christopher Taylor Williams | Family | title granted | Bachelor of Science in Computer Science and Engineering | |
| Christopher Taylor Williams | Family | Name | Christopher Taylor Williams | |
| Christopher Taylor Williams | Family | course name | Computer Science | |
| Christopher Taylor Williams | Family | Job title | Director of Technology | |
| Christopher Taylor Williams | Family | Sex | Male | |
| Christopher Taylor Williams | Public | Name | Christopher Taylor Williams | |
| Christopher Taylor Williams | Public | Sex | Male | 1H16 | shared information X access_class

UNIVERSAL RELATIONSHIPS, SYSTEM AND METHOD TO BUILD AND OPERATE A REPOSITORY TO MANAGE AND SHARE TRUSTED INFORMATION OF ENTITIES AND THEIR RELATIONSHIPS

BACKGROUND

Prior Art

Today Internet connects almost every computer in the world and almost every entity uses Internet to work, access on-line services, provide on-line services and even establish relationships with other entities.

Many people and companies use global social network systems like FaceBook, Google Circles and LinkedIn to find or make new friends all over the world, find new jobs, stay in contact with clients, etc. Our social lives were extended from the real world to the virtual world brought to us by the Internet.

Many people are entering the virtual world provided by the Internet and effectively living also a virtual life. On games and sites like "Second Life", "Minecraft", "Club Penguin", etc. adults and children can experience a virtual life in which they can assume another identity. This fake identity may be appropriate for games and fun but not to avoid responsibility or to hide a real identity.

On-line services rely on the information typed in by the user to identify himself/herself. This information is very difficult to be verified, so in most cases just the email is verified. There is no electronic method to check the truthfulness of most of the information given.

An email is very easy to produce. Many free email services distribute email to anyone that requests one and in most cases no information of the user is verified.

On the other hand it is hard for any user to know if the on-line service he/she is using is authentic or faked by an unscrupulous entity with malefic intentions.

Today it is complex and expensive to validate any received information directly with its official source, making the task of verifying the identity of one entity difficult to be accomplished, so criminals are using this vulnerability to commit crimes against entities through the Internet.

Today it is very easy for someone to create a fake identity in the Internet and commit crimes against any entity connected to the Internet. These crimes include for example cyber-bulling and stealing. Anyone can create a fake profile on a social network, at a sales site, or even create its own fake sales site to fool and steal from entities.

Due to the exponential escalation of Internet crimes, on May 8, 2000 the Internet Crime Complaint Center (IC3) was created. The IC3 is a partnership between the FBI and NW3C (funded by BJA) to address the ever-increasing incidence of online fraud. According to the IC3 2012 Annual Internet Crime Report, the number of complaints is still increasing exponentially every year. In 2012, the IC3 received 289,874 consumer complaints with an adjusted dollar loss of $525,441,110, which is an 8.3-percent increase in reported losses since 2011.

Even email (electronic mail) is used by unscrupulous entities to fool and steal from other entities, through the practice known as SPAM (send of unsolicited bulk messages).

SPAM causes as well a traffic problem. According to Symantec Intelligence Quarterly Key Findings, from July-September 2010 quarter, 91% of e-mail messages that were sent or received by their 133 Million clients were SPAM. This represents 14.6 trillion SPAM messages. This is a small example of the traffic and CPU processing waste caused by SPAM.

Today we still have difficulty to validate the information received from an entity regardless the type of media that we received it through. For example, if you receive a Curriculum Vitae from someone, you don't have any simple tool that allows you to validate the information that lies in it. This applies to all information someone fills on paper or over the Internet. We still use special papers and inks to produce official documents and money in order to reduce the risk of falsifications.

All social networks today allow anyone to issue any information that he/she wants. Just few information can be easily validated. Simple information like age and sex are not validated at all, opening a gap that allows for example pedophiles to get close to our children and criminals to get close to us.

Today it is very difficult for parents to have control over the content their children have access to, or relationships their children establish through the Internet. There are programs to filter Internet traffic but they are not so easy to operate, since these systems operate through filters based on Internet addresses and keywords that you must specify and therefore is only able to prevent the danger we already aware of, but ineffective to the ones we still ignore.

Advantages

This method and system shows how to build a repository of trusted information generated through relationships entities develop. This method and system allows the registration of relationships and the information generated by each entity involved in it.

Each entity can generate information and share it or not with its partner in the relationship. If this information is declared shared by its creator, the related entity can share this information to other entities it is related to through any type of relationship it has.

The information generated by entities cannot be edited, altered or changed by any other entity than its creator. Other entities can rely and trust that the information is true and issued by the entity that is responsible for generating it.

From the description above, a number of advantages of some embodiments of my system become evident:

Share trusted information: The information shared is issued only by its creator giving the certainty to others that it is provided without modification directly from its source so it is reliable and can be trusted;

Information is always updated: An entity has direct access to the information that is maintained by its creator entity. Whenever a creator entity updates this information, all related entities will automatically have access to the last update.

Privacy preservation: No information is required to be public. Any information an entity chooses to share can be associated to any group of related entities to which read access will be given;

Anti-SPAM: Any given entity is able to restrict their message acceptance to their related entities, and therefore will not receive SPAMs anymore;

Anti-SPAM at source: an e-mail server may validate if the recipient user wishes to receive an e-mail from its own user by asking this system. If this system says that the recipient doesn't want to receive the e-mail, it will inform its own user the e-mail could not be sent. Preventing SPAM from being sent at the source reduces Internet traffic, CPU processing and destination mail servers occupation.

Auto-customization of sites for their visitors: Since a site can ask this system who is visiting it, it can present the best customization for its visitors, nevertheless the user can still be anonymous;

Prevention from cyber-crime, cyber-bulling, "Trolls", etc.: Social networks may require entity ID validation as a prerequisite for accessing it. Even if the site allows people to create a fake profile, the identity of the user will be registered and can be tracked. Aggressors are easily identified.

Selection of Public: Sites can prevent visitors from visiting itself asking this System for information, for example: sex related content should not be presented for a child; Applications like social networks or chat rooms may reject some entity based on inadequate or missing requested information like name, age, sex, etc.;

Market research: The site can ask this system for public shared information about the entity that is visiting it. Therefore on-line services and site managers can have powerful market data collected from their visitors without invading their privacy or having them to fill forms.

Relationship establishment supervision by legal guardian entities: Entities that are legal guardians for other entities must approve the establishment of relationships. This allows for example parents to analyze and approve or not the relationships their children are willing to establish.

Single Sign On: Once the Session is established the entity ID and security level used in the authentication process can be verified by an online service. The on-line service can choose to accept the current ID without asking for another identification. For instance, if the entity established its session using a high security level authentication process, such as biometrics, its online banking service may choose to accept the entity ID without requiring any further authentication process.

End to end authentication: the session that is established by the user is made between its device and this system's servers. So, the identity of the user can be tracked regardless he/she is using an IPv6, a real IPv4, or even behind NAT.

Reputation: An entity reputation may be measured by its established relationships. As an entity, I may allow educational institutions, social clubs, companies that I am related to through the system, to reveal information regarding our relationship. For instance, when I graduate from an educational institution that I'm related to, it is the educational institution itself that reveals the information regarding the degree I have been granted, and since I'm related to this educational institution, I may allow any other Entity to have read access to this information, receiving it directly from its original source.

Smooth transition: Entities can begin using this system without losing any functionality of the Internet as they have now. The integration to this system does not prevent the entity to serve or use on-line systems that are not yet integrated.

SUMMARY

This method and system allows the creation of a repository of trusted information generated by entities that are related through any kind of relationship.

The information stored and shared by the system is maintained, edited, updated, and issued only by its creator entity.

The information that is shared with the related entity on a relationship can also be read by any other entity that has been granted read access to such information. The sharing criterion is decided by the related entity. Any information one entity decides to share, can be shared with general public or with any specific group of related entities. For example, one person can share publicly his name, age and sex but privately, to a specific group, his/her education background, contacts or employment information.

Whenever an entity shares information, the name of the entity that is responsible for issuing this information is also shown. For example, if a university says that an entity has been graduated, you can rely on the truthfulness of the title.

An entity can empower another entity to represent itself by a delegation relationship. Such delegation allows a delegated entity to establish relationships, create and maintain information of a relationship in the name of the entity that empowered it. For example, this system allows a government to empower a notary public to represent it and grant your son a citizenship relationship when he is born.

An entity can be legal guardian for another entity. In that case, all relationships will be subject to approval by the legal guardian entity before being established. So, when your son is born a relationship of legal guardian can be established between you and your son by a delegated entity representing your government.

An entity can regulate other relationship types for an entity that it is related to. The regulated relationships will be subject to approval by the regulator entity. For instance, when an entity wishes to establish a marriage relationship with another entity, this relationship must be approved by the regulator entities involved.

This system can have interfaces with other systems: other network systems can ask this system for verifying an entity identity, entity relationships and related information. This allows other systems to explore many known features like single sign on, Anti-Spam, and allows as well the exploration of many new features like access to trusted information, auto-customization of sites, or market research based on the public information of the visitor, content access control based on the public information of the visitor, and many other features that would not be possible or would be very difficult to achieve without this system.

An entity has direct access to the information that is maintained by its creator entity. Whenever a creator entity updates this information, all related entities would automatically have access to the last update.

This system simplifies the task of validating information and brings to the Internet a powerful tool that permits the connection of the entities of the virtual world to the real world.

DRAWINGS

Figure 1D:
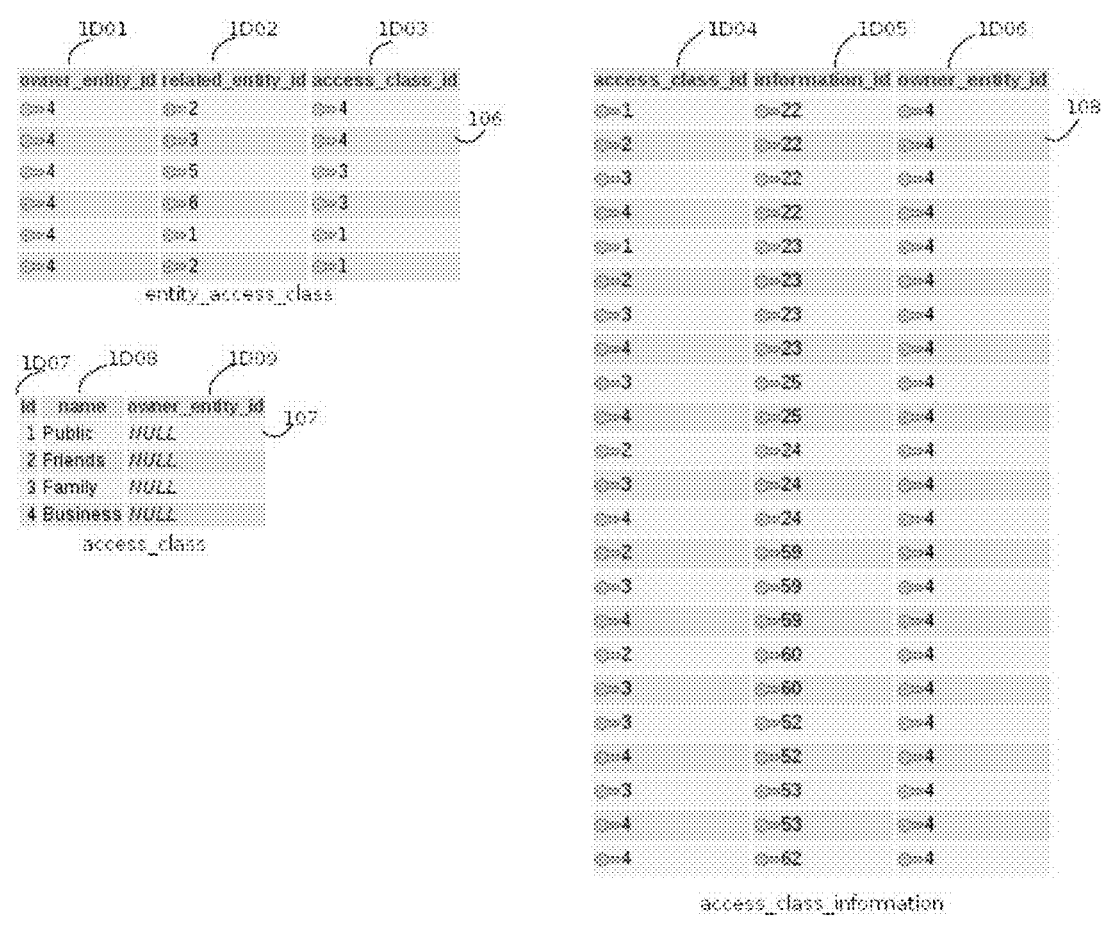
Figure 1E:
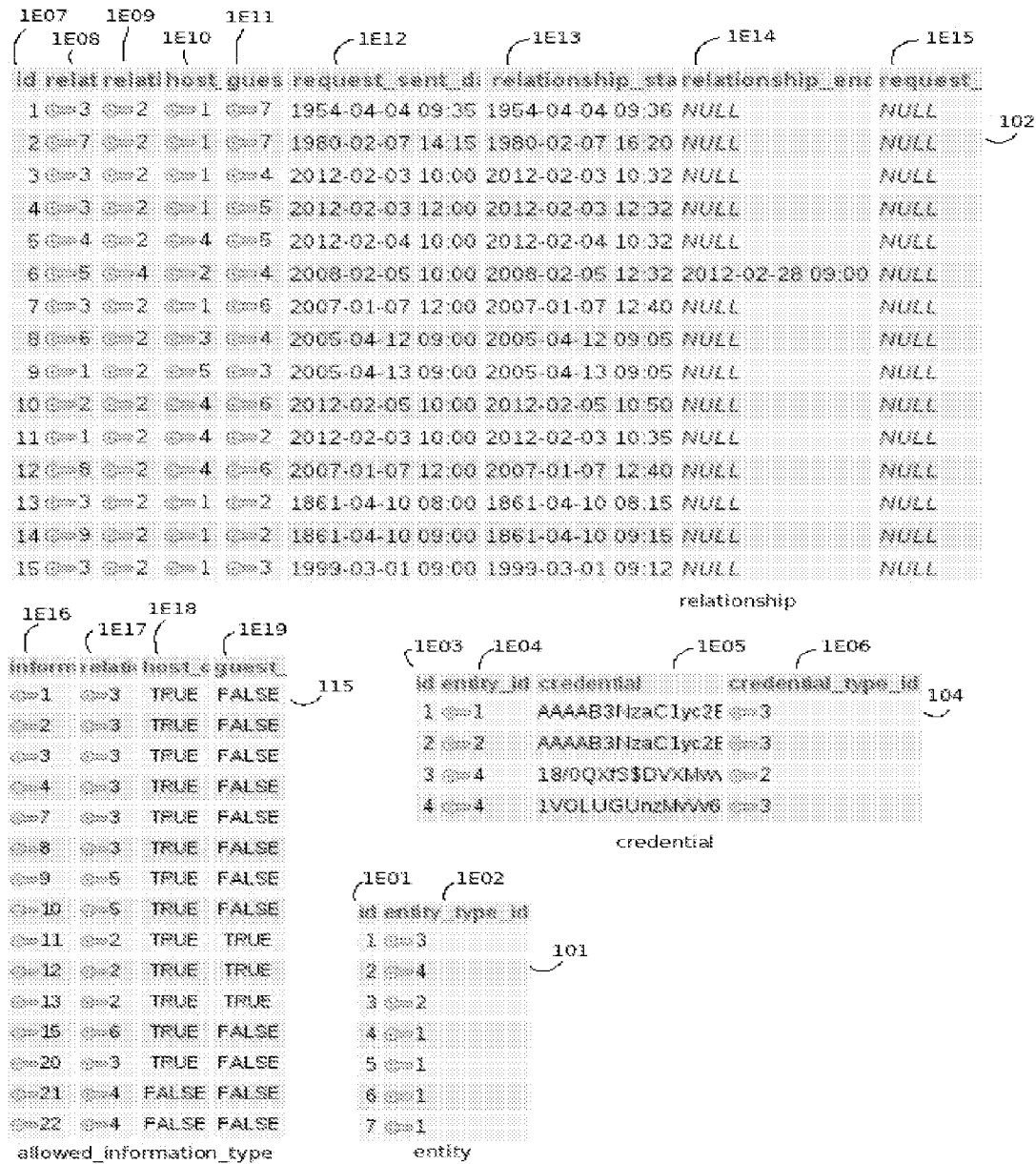

FIG. 1—Example embodiment of database schema to represent entities, relationships and related information;

FIG. 1A—Table population samples encompassing entity_type, relationship_type, credential_type, and relationship_status;

FIG. 1B—Table population samples encompassing information_type, and data_type;

FIG. 1C—Table population samples encompassing allowed_relationship_type, request_to_entity_type, relationship_prerequisite, and relationship_approval;

FIG. 1D—Table population samples encompassing entity_access_class, access_class, and access_class_information;

FIG. 1E—Table population samples encompassing entity, credential, relationship, and allowed_information_type;

FIG. 1F—Table population sample information;

FIG. 1G—Table population sample session;

FIG. 1H—Example table views demonstrating related_entity by access_class, shared_relationship_information by provider_entity, shared_information by access_class.

Figure 2:
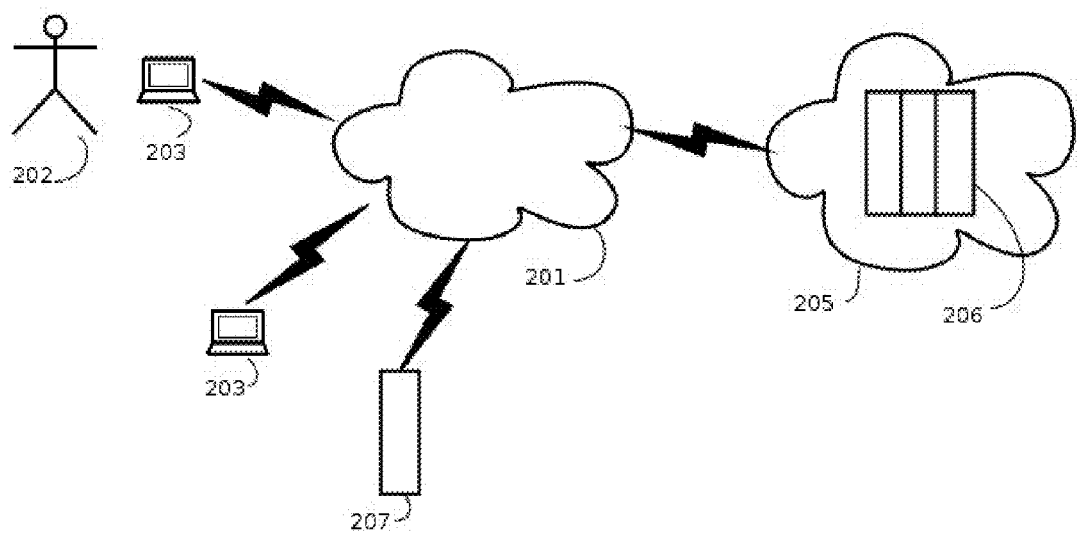
Figure 3:
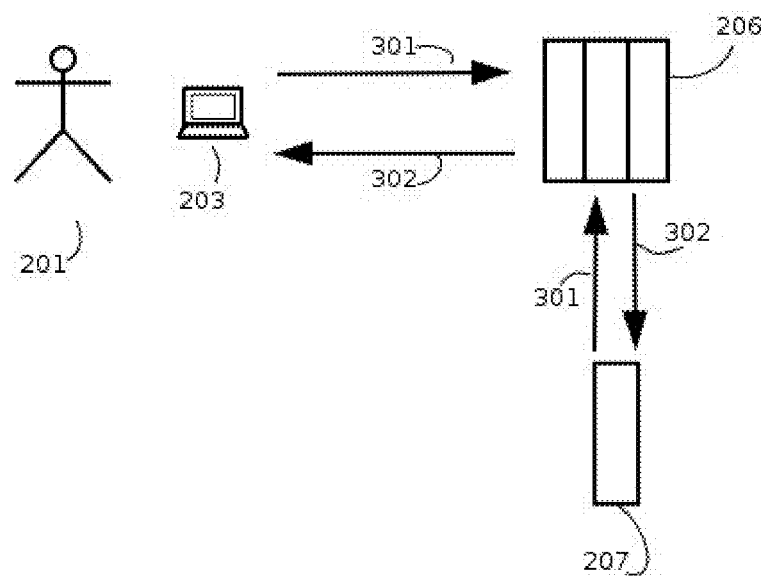
Figure 4:
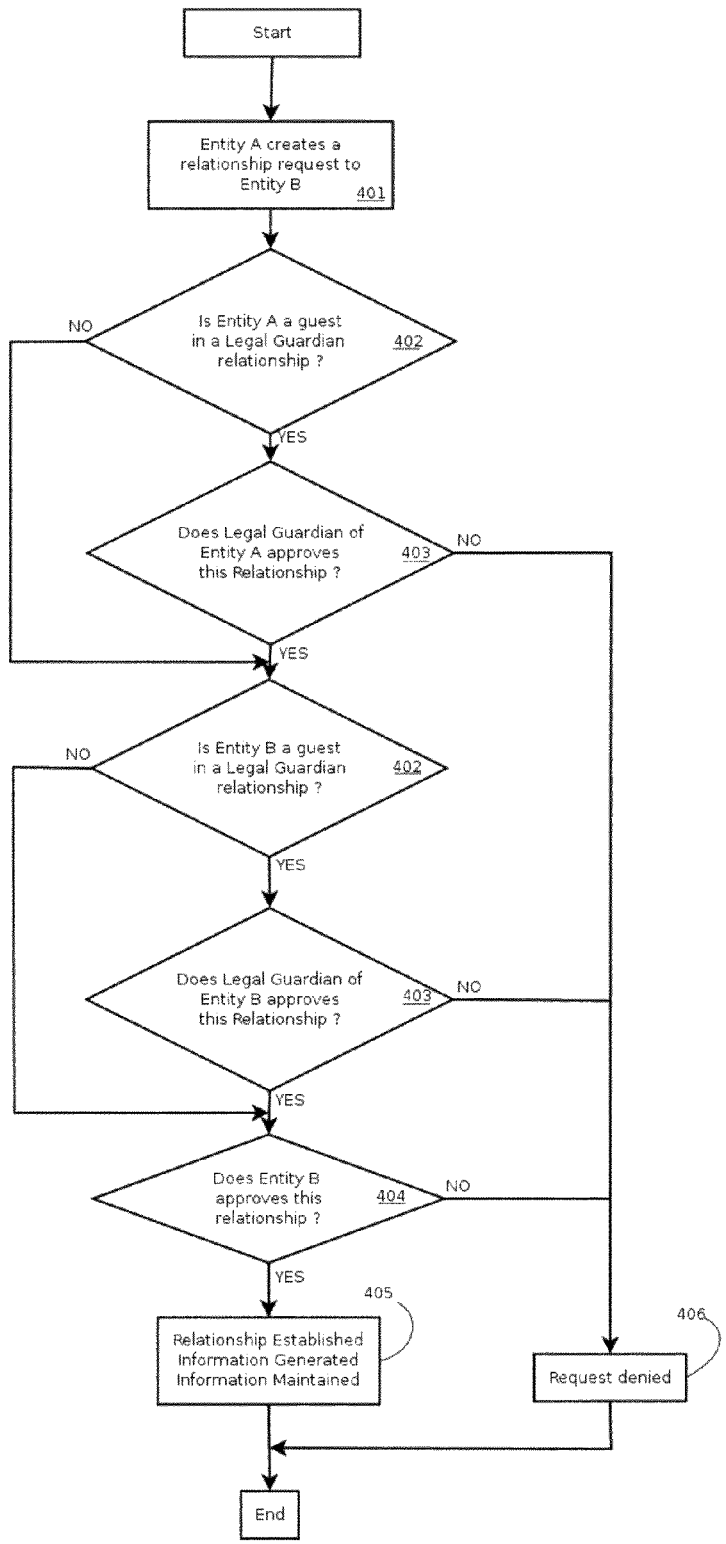

FIG. 2—Representation of U.R. System access by user devices and network servers;

FIG. 3—Representation of a U.R. Session Log On process that allows a user device, or a network server to establish a U.R. Session with the U.R. servers;

FIG. 4—Flowchart of a process to establish a relationship.

Figure 5:
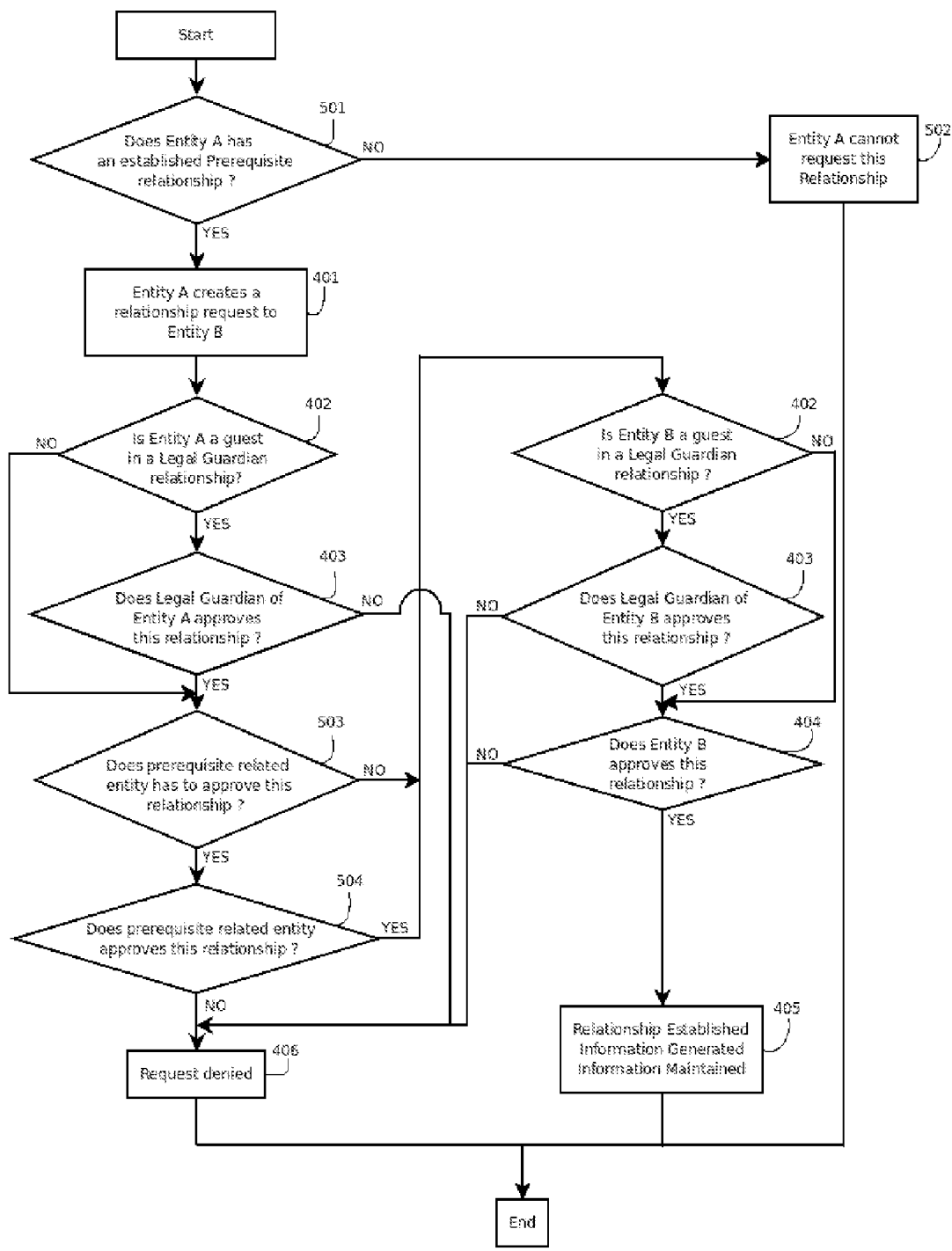

FIG. 5—Flowchart of a process to establish a relationship that demands a prerequisite relationship.

Figure 6:
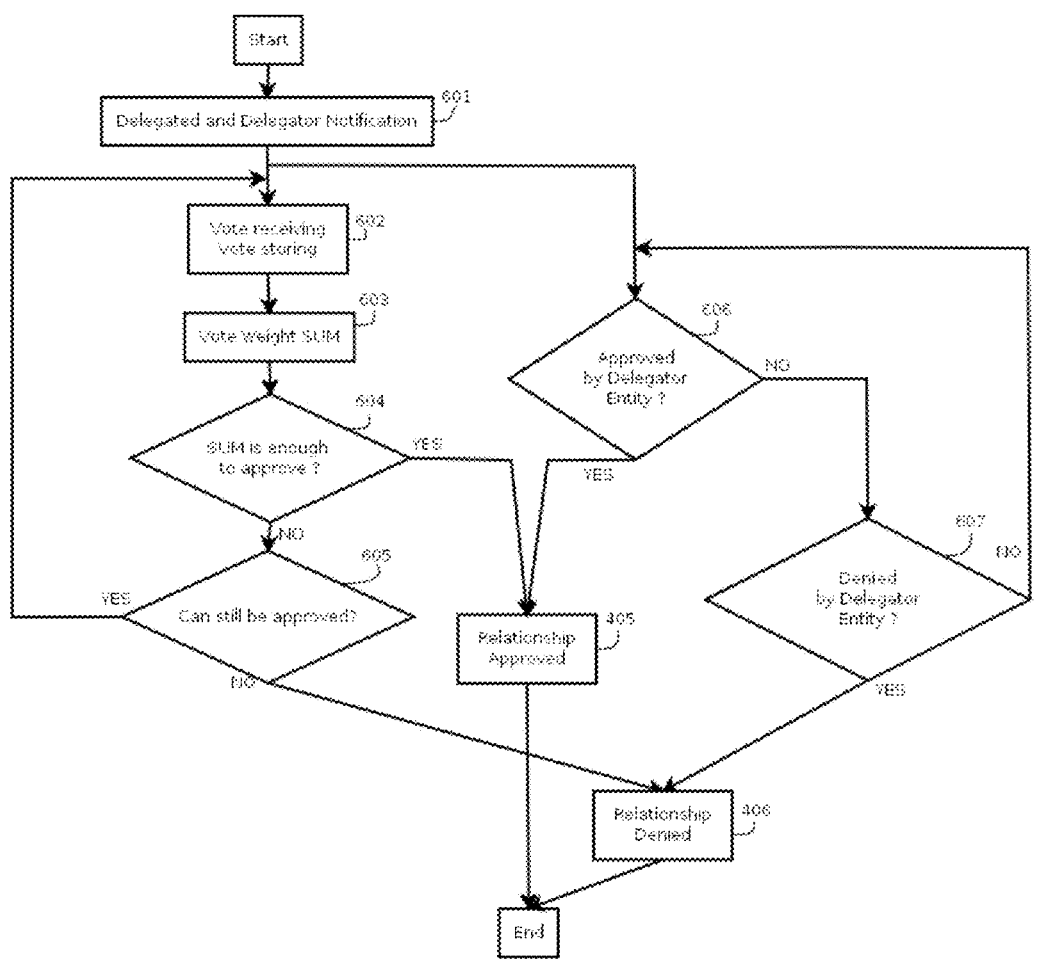

FIG. 6—Flowchart of a Delegated entity voting process.

Figure 7:
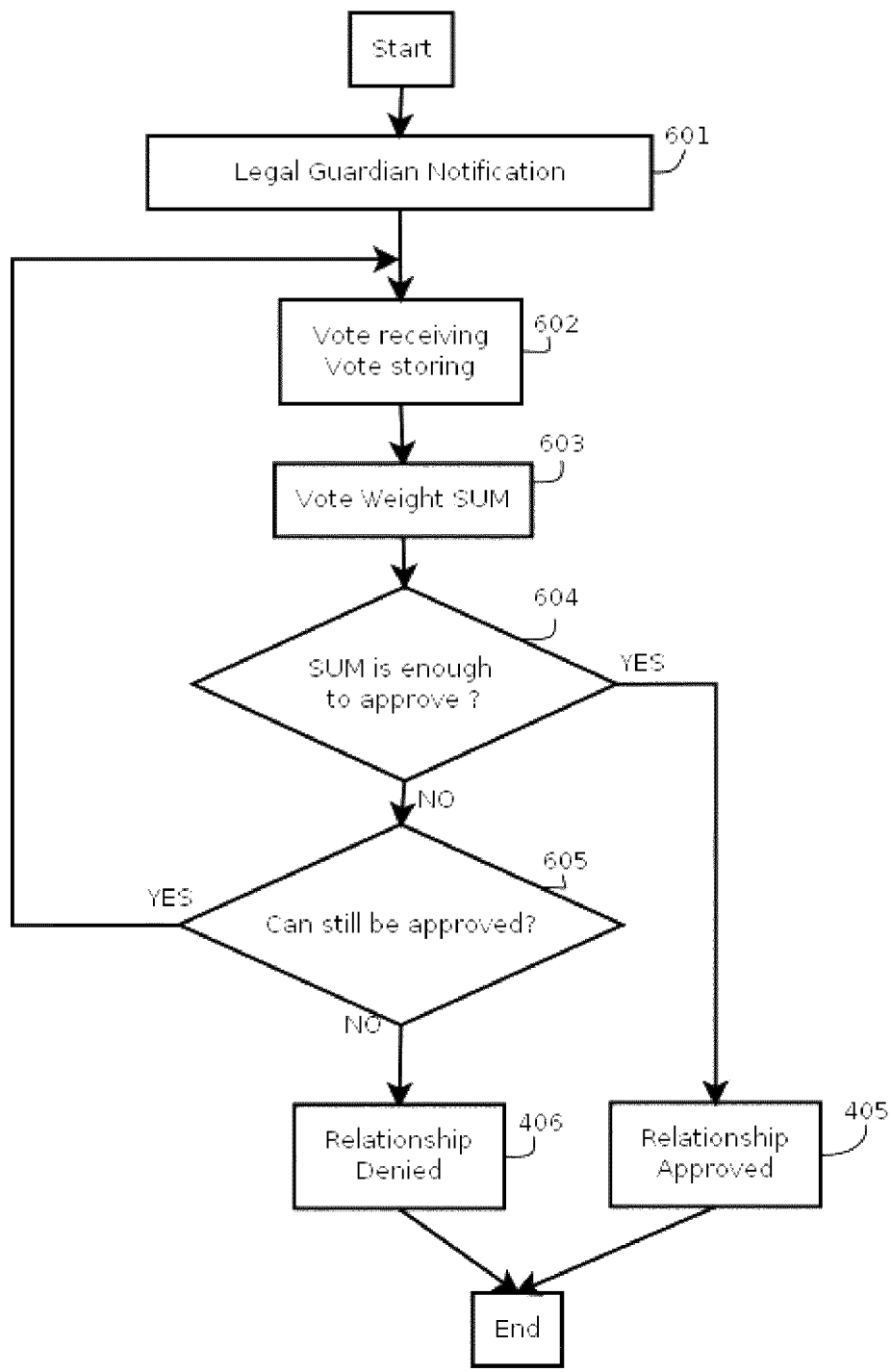

FIG. 7—Flowchart of a Legal Guardian entity approval process.

Figure 8:
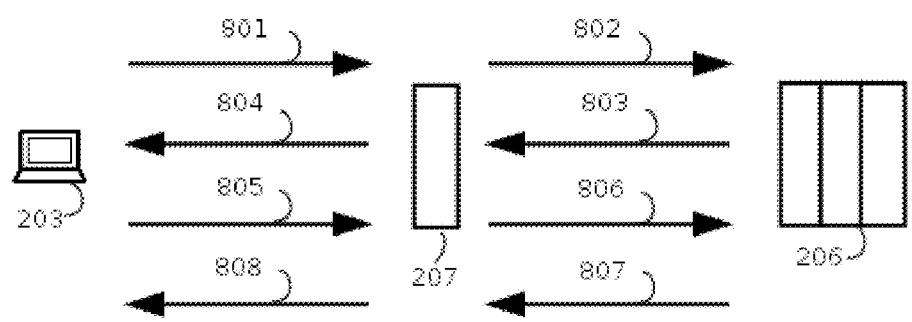

FIG. 8—HTTP Guest U.R. Session validation process

Figure 9:
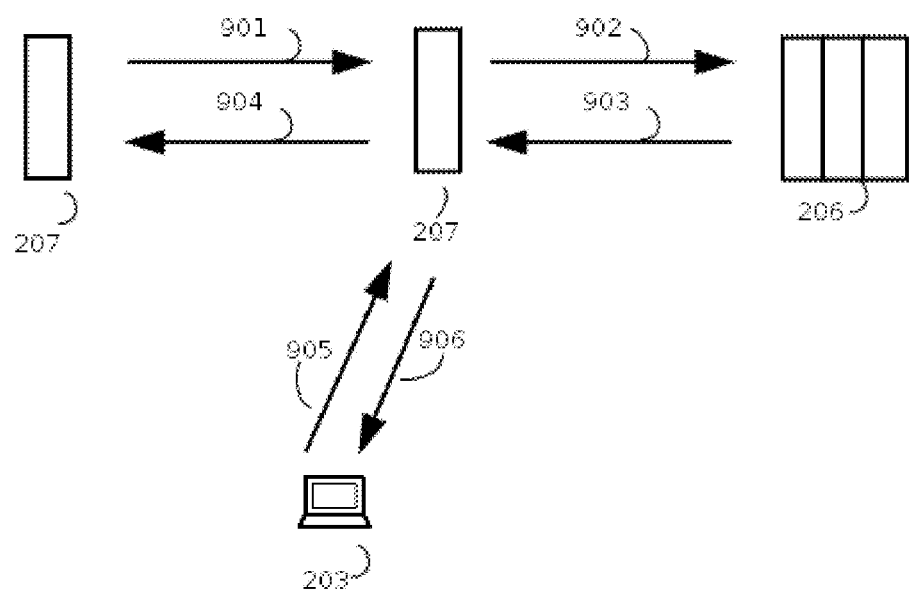

FIG. 9—Anti-SPAM validation process: incoming and outgoing messages.

REFERENCE NUMERALS 101 entity table
102 relationship table
103 information table
104 credential table
105 credential_type table
106 entity_access_class table
107 access_class table
108 access_class_information table
109 entity_type table
110 allowed_relationship_type table
111 relationship_type table
112 relationship_status table
113 information_type table
114 data_type table
115 allowed_information_type table
116 request_to_entity_type table
117 relationship_prerequisite table
118 session table
119 relationship_approval_votes table
120 relationship_voting_rules table
121 delegated_entity_empowerment table
1A01 column id on entity_type 109 table
1A02 column name on entity_type 109 table
1A03 column id on relationship_type 111 table
1A04 column name on relationship_type 111 table
1A05 column must_be_approved on relationship_type 111 table
1A06 column id on credential_type 105 table
1A07 column name on credential_type 105 table
1A08 column id on relationship_status 112 table
1A09 column name on relationship_status 112 table
1B01 column id on information_type 113 table
1B02 column name on information_type 113 table
1B03 column data_type_id on information_type 113 table
1B04 column id on data_type 114 table
1B05 column name on data_type 114 table
1C01 column id on allowed_relationship_type 110 table
1C02 column relationship_type_id on allowed_relationship_type 110 table
1C03 column can_request on allowed_relationship_type 110 table
1C04 column entity_type_id on allowed_relationship_type 110 table
1C05 column allowed_relationship_type_id on request_to_entity_type 116 table
1C06 column entity_type_id on request_to_entity_type 116 table
1C07 column allowed_relationship_type_id on relationship_prerequisite 117 table
1C08 column prerequisite_relationship_type_id on relationship_prerequisite 117 table
1C09 column prerequisite_entity_must_approve on relationship_prerequisite 117 table
1C10 column entity_id on relationship_approval_votes 119 table
1C11 column relationship_id on relationship_approval_votes 119 table
1C12 column entity_vote_weight on relationship_approval_votes 119 table
1C13 column approved on relationship_approval_votes 119 table
1C14 column voting_date on relationship_approval_votes 119 table
1C15 column relationship_type_id on relationship_voting_rules table 120
1C16 column delegator_entity_id on relationship_voting_rules table 120
1C17 column minimum_weight_for_approval on relationship_voting_rules table 120
1C18 column guarded_entity_id on relationship_voting_rules table 120
1C19 column delegator_entity_id on delegated_entity_empowerment table 121
1C20 delegated_relationship_type_id on delegated_entity_empowerment table 121
1C21 delegation_relationship_id on delegated_entity_empowerment table 121
1C22 delegated_entity_id on delegated_entity_empowerment table 121
1C23 vote_weight on delegated_entity_empowerment table 121
1D01 column owner_entity_id on entity_access_class 106 table
1D02 column related_entity_id on entity_access_class 106 table
1D03 column access_class_id on entity_access_class 106 table
1D04 column access_class_id on access_class_information 108 table
1D05 column information_id on access_class_information 108 table
1D06 column owner_entity_id on access_class_information 108 table
1D07 column id on access_class 107 table
1D08 column name on access_class 107 table
1D09 column owner_entity_id on access_class 107 table
1E01 column id on entity 101 table
1E02 column entity_type_id on entity 101 table
1E03 column id on credential 104 table
1E04 column entity_id on credential 104 table
1E05 column credential on credential 104 table
1E06 column credential_type_id on credential 104 table
1E07 column id on relationship 102 table
1E08 column relationship_type_id on relationship 102 table
1E09 column relationship_status_id on relationship 102 table
1E10 column host_entity_id on relationship 102 table
1E11 column guest_entity_id on relationship 102 table
1E12 column request_sent_date on relationship 102 table
1E13 column relationship_start on relationship 102 table 1E14 column relationship_end on relationship 102 table
1E15 column relationship_request_denial_date on relationship 102 table
1E16 column information_type_id on allowed_information_type 115 table
1E17 column relationship_type_id on allowed_information_type 115 table
1E18 column host_can_issue on allowed_information_type 115 table
1E19 column guest_can_issue on allowed_information_type 115 table
1F01 column id on information 103 table
1F02 column owner_entity_id on information 103 table
1F03 column relationship_id on information 103 table
1F04 column information_type_id on information 103 table
1F05 column value on information 103 table
1F06 column others_can_read on information 103 table
1F07 column parent_information_id on information 103 table
1G01 session_id on session 118 table
1G02 expiration_datetime on session 118 table
1G03 entity_id on session 118 table
1G04 public_key on session 118 table
1G05 credential_type_id on session 118 table
1H01 entity_name in view related entity vs. access_class 1H14
1H02 access_class in view related entity vs. access_class 1H14
1H03 related_entity in view related entity vs. access_class 1H14
1H04 entity_name in view shared relationship information vs. provider entity 1H15
1H05 relationship in view shared relationship information vs. provider entity 1H15
1H06 info_type in view shared relationship information vs. provider entity 1H15
1H07 info_value in view shared relationship information vs. provider entity 1H15
1H08 related_entity name in view shared relationship information vs. provider entity 1H15
1H09 information_provider_entity name in view shared relationship information vs. provider entity 1H15
1H10 entity_name in view shared information vs. access_class 1H16
1H11 access_class in view shared information vs. access_class 1H16
1H12 information_type in view shared information vs. access_class 1H16
1H13 information in view shared information vs. access_class 1H16
1H14 related entity vs. access class view
1H15 Shared relationship information vs. provider entity view
1H16 Shared information vs. access class information view
201 Computer network such as the Internet
202 User
203 User device
205 U.R. System network
206 U.R. System servers
207 Network server, serving any network service
301 Session log on request
302 Session log on response
401 relationship request creation process
402 legal guardian verification process
403 legal guardian approval process
404 guest entity approval process
405 relationship establishment process
406 request denial process
501 prerequisite relationship verification process
502 notification of missing prerequisite relationship process
503 regulator entity approval verification process
504 regulator entity approval process
601 entity notification process
602 voting storage process
603 vote counting process
604 vote approval verification process
605 approval viability verification process
606 delegate approval verification process
607 delegate denial verification process
801 HTTP service request
802 U.R. Session verification message
803 U.R. Session verification message answer
804 HTTP answer
805 HTTP service request
806 token validation message
807 token validation answer
808 HTTP answer
901 incoming e-mail message
902 recipient and sender validation message
903 recipient and sender validation answer
904 acceptance or denial of incoming e-mail
905 outgoing e-mail message
906 acceptance or denial of outgoing e-mail

GLOSSARY OF TERMS

U.R. System: the name of this system, Universal Relationship System

Entity: Something that has a single separate and independent existence that may establish some kind of relationship encompassing people, companies, governments, institutes, etc.

Relationship: Any kind of connection, association or involvement between entities.

Entity A: Entity that originates requests.

Entity B: Entity that receives requests.

Related information: Information associated to a relationship, generated by an entity involved in that relationship.

Host entity: Entity that requests a relationship with a guest entity.

Guest entity: Entity that receives a relationship request from a Host entity.

Related entity: Entity that has an established relationship with another entity.

Receiver entity: Entity that receives information generated by the related entity.

Delegated entity: Guest entity in a Delegation relationship that was empowered to represent another entity on managing relationships and related information in the name of the represented entity;

Regulator entity: Entity that regulates other types of relationship to a Guest entity that it is related to. The existing relationship with the regulator entity is a prerequisite relationship.

Provider entity: any entity that issues information.

Legal guardian entity: Entity that is legally responsible for another entity;

Session: whenever an entity accesses the system, a session is established. In order to establish a session, it is required that the entity identifies itself through a valid credential presentation.

SPAM: Unsolicited electronic mail or text message sent in this way. Many times used by criminal and unscrupulous elements to fool, invade computers, and steal from entities.

Cyberbulling: The act of blustering, quarrelsome, overbearing person who habitually badgers and intimidates smaller or weaker people online.

Troll: Internet slang defining a troll as a person who sows discord on the internet by starting arguments or upsetting people, by posting inflammatory, extraneous, or off-topic messages in an online community (such as a forum, chat room, or blog), either accidentally or with the deliberate intent of provoking readers into an emotional response or of otherwise disrupting normal on-topic discussion. See http://en.wikipedia.org/wiki/Troll (Internet)

DETAILED DESCRIPTION

The following detailed description is an exemplary embodiment of the U.R. system and refers to accompanying drawings. The same reference numerals in different drawings identify the same or similar elements.

This system and method allow the reproduction of real world relationship establishment processes and the management of their related information. This system allows an entity to receive information about another entity directly from the information source. For instance, when an entity has been granted access to the curriculum vitae from another entity, all information displayed there will be issued directly by the sources. So, the information about education background will be issued directly from each educational institute he/she attended.

This section is divided into subsections and illustrates operation processes and types of relationships managed by U.R. System. The system may represent many other different processes and relationships, not only the ones described here in this application.

DETAILED DESCRIPTION

Registering Entities, Relationships and Information

FIG. 1 and FIG. 1A through FIG. 1G, depicts part of an example database schema that shows how entities, relationships and related information may be represented and stored.

FIG. 1 represents tables, their columns, primary keys, and foreign keys linked to each corresponding primary key. FIG. 1 also demonstrates the links between tables. All fields named id are unique. All columns with the _id suffix are used as foreign keys. Primary keys are underlined.

Every entity will have only one record in entity table 101 that might be created by itself through a web interface. After having his/her entity created, he/she may ask other entities to establish relationships. The information generated by these relationships then may be shared with other entities.

A record in entity table 101 represents an entity and has only two columns as shown in FIG. 1 and FIG. 1E. Column id 1E01 is a unique id that turns an entity unique to the System, and column entity_type_id 1E02 determines the type of the entity and links to entity_type table 109.

The entity type defines which types of relationships may be established by an entity.

FIG. 1 and FIG. 1A depict entity_type table 109 that describes the types of entities. This table contains two columns: id 1A01, and name 1A02.

Column id 1A01 is a primary key.

Column name 1A02 describes the name of the type of the entity.

A relationship can be established between two entities by a host entity sending an invitation message to a guest entity. This message may be implemented using any available technology such as email, SMS, or through a web interface of this System. The establishment of the relationship is submitted to an approval process and if approved each entity may create information and store it in this System. This information will be linked to this relationship and can only be changed or removed by its issuer entity. The issuer entity may give read access to this information for the related entity.

Once an entity has received read access to information shared by a related entity, it can share this read access with other entities through the establishment of other relationships.

FIG. 1 and FIG. 1E depict relationship table 102 that registers the relationships from request to end, and contains nine columns: id 1E07, relationship_type_id 1E08, relationship_status_id 1E09, host_entity_id 1E10, guest_entity_id 1E11, request_sent_date 1E12, relationship_start 1E13, relationship_end 1E14, and request_denial_date 1E15.

Column id 1E07 is the primary key.

Column relationship_type_id 1E08 is a foreign key that links to table relationship_type 111, and represents the type of the relationship.

Column relationship_status_id 1E09 is a foreign key that links to table relationship_status 112, and represents the current status of the relationship.

Column host_entity_id 1E10 is a foreign key that links to table entity 101, and represents the entity that sent the request for establishing relationship.

Column guest_entity_id 1E11 is a foreign key that links to table entity 101, and represents the entity that receives the request for establishing relationship.

Column request_sent_date 1E12 represents the date the request for establishing relationship was sent.

Column relationship_start 1E13 represents the date the relationship was established.

Column relationship_end 1E14 represents the date the relationship was finished.

Column relationship_denial_date 1E15 represents the date the request for establishing relationship was denied.

FIG. 1 and FIG. 1A depict relationship_type table 111 that registers the types of relationship. This table contains three columns: id 1A03, name 1A04, and must_be_approved 1A05.

Column id 1A03 is a primary key.

Column name 1A04 describes the name of the relationship.

Column must_be_approved 1A05 represents a flag that shows if a guest entity must approve the establishment of this type of relationship. For example, in order to establish a marriage relationship, the guest entity must approve, whereas in a public relationship between two entities, the guest does not have to approve.

FIG. 1 and FIG. 1A depict relationship_status table 112 that describes the possible status of a relationship. This table contains two columns: id 1A08, and name 1A09.

Column id 1A08 is a primary key.

Column name 1A09 describes the name of the status, such as requested, active, denied, etc.

After the establishment of a relationship, information is generated and can be shared. Related entities can generate information according to the type of relationship that has been established. Each entity in this relationship can generate information and give read access to it to other related entities. For example, when a government entity establishes a citizenship relationship with a citizen entity, the government can generate a social security number for this citizen. The government gives the citizen read access to this information. The citizen can then share this read access to any other entity he/she wants to. Any entity that has been given read access to this information will access the information that has been generated and stored by the government, eliminating duplicity of information. The identity of the creator of this information, in this case the government, is also informed, guaranteeing the legitimacy of this information.

FIG. 1 and FIG. 1F depict information table 103 that registers information that an entity wishes to register. This table contains seven columns: id 1F01, owner_entity_id 1F02, relationship_id 1F03, information_type_id 1F04, value 1F05, others_can_read 1F06, parent_information_id 1F07.

Column id 1F01 is the primary key.

Column owner_entity_id 1F02 is a foreign key that links to table entity 101, and represents the entity that has issued this information.

Column relationship_id 1F03 is a foreign key that links to table relationship 102. If this field is filled it represents the relationship that is related to this information.

Column information_type_id 1F04 is a foreign key that links to table information_type 113, and represents the type of the information.

Column value 1F05 represents the information itself.

Column others_can_read 1F06 represents a flag that indicates if the owner is willing to share or not this information with other entities.

Column parent_information_id 1F07 links this information to parent information. It may be used to register complex fields like addresses.

FIG. 1 and FIG. 1B depict information_type table 113 that registers the types of information. This table contains three columns: id 1B01, name 1B02, and data_type_id 1B03.

Column id 1B01 is a primary key.

Column name 1B02 describes the type of information, such as name, sex, job title, etc.

Column data_type_id 1B03 is a foreign key that links to table data_type 114 and represents the type of data storage.

FIG. 1 and FIG. 1B depict data_type table 114 that describes the type of data storage. This table contains two columns: id 1B04, and name 1B05.

Column id 1B04 is a primary key.

Column name 1B05 describes the type of data storage, such as integer, real, binary, etc.

The type of relationship restricts the type of information that may be created by the related entities. For example, only a government entity may create a social security number information.

FIG. 1 and FIG. 1E depict allowed_information_type table 115 that registers the type of information an entity is able to issue in a relationship. This table contains four columns: information_type_id 1E16, relationship_type_id 1E17, host_can_issue 1E18, and guest_can_issue 1E19.

Column information_type_id 1E16 is a foreign key that links to table information_type 113 and represents the information type can be issued in this relationship type.

Column relationship_type_id 1E17 is a foreign key that links to table relationship_type 111 and represents the type of relationship.

Column host_can_issue 1E18 represents a flag that shows if a host entity can issue this type of information in this type of relationship.

Column guest_can_issue 1E19 represents a flag that shows if a guest entity can issue this type of information in this type of relationship.

DETAILED DESCRIPTION

Delegation and Legal Guardian Relationships

Some entities may need the approval from another entity to establish some types of relationships, and in this embodiment we call this type of relationship Legal Guardian. For example, Legal Guardian relationship type might be implemented as follows: the establishment of a legal guardian type of relationship could be initiated by government type entity that empowers an entity as a Legal Guardian of another. So, parents could be empowered as legal guardians of their child.

An entity may choose to delegate its own power on the establishment and management of relationships to other entities, and in this embodiment we call it Delegation Relationship. A government type entity may delegate its power to its own institutions, empowering them to establish relationships in its name.

Both, Legal guardian and Delegation relationships may be performed jointly by more than one entity, and a voting process with different vote weights can be used for the relationship establishment approval or denial.

FIG. 1 and FIG. 1C depict delegated_entity_empowerment table 121 that registers the vote weight given to each delegated entity for each delegated relationship. This table contains five columns: delegate_entity_id 1C19, delegated_relationship_type_id 1C20, delegated_relationship_id 1C21, delegated_entity_id 1C22, and vote_weight 1C23.

Column delegate_entity_id 1C19 is a foreign key that links to table entity 101, and represents the entity that delegates its power in this relationship.

Column delegated_relationship_type_id 1C20 is a foreign key that links to table relationship_type 111, and represents the type of relationship that was delegated.

Column delegated_relationship_id 1C21 is a foreign key that links to table relationship 102, and represents the delegation relationship.

Column delegated_entity_id 1C22 is a foreign key that links to table entity 101, and represents the entity that is empowered by delegate entity to represent itself in this delegated relationship_type.

Column vote_weight 1C23 represents the delegated entity vote weight in this delegated relationship type.

DETAILED DESCRIPTION

Relationship Establishment

As mentioned before, a relationship can be established between two entities by a host entity sending an invitation message to a guest entity.

The type of the entity defines the type of relationship that may be established. Some entities may request the establishment of a relationship while others can just accept or deny a request.

FIG. 1 and FIG. 1C depict allowed_relationship_type table 110 that registers the type of relationship an entity is able to establish. This table contains four columns: id 1C01, relationship_type_id 1C02, can_request 1C03, and entity_type_id 1C04.

Column id 1C01 is a primary key.

Column relationship_type_id 1C02 is a foreign key that links to table relationship_type 111 and represents the relationship type an entity of this type is able to establish.

Column can_request 1C03 represents a flag that shows if an entity of this type can_request this type of relationship. If this type of entity is not able to request, it can only be invited.

Column entity_type_id 1C04 is a foreign key that links to table entity_type 109 and represents the type of entity that is able to establish this type of relationship.

FIG. 1 and FIG. 1C depict request_to_entity_type table 116 that registers the type of entities that can be invited to a relationship. This table contains two columns: allowed_relationship_type_id 1C05, and entity_type_id 1C06.

Column allowed_relationship_type_id 1C05 is a foreign key that links to table allowed_relationship_type 110.

Column entity_type_id 1C06 is a foreign key that links to table entity_type 109, and represents which entity types can be invited to a relationship of this type.

Some relationships can only be established when a previous relationship exists. For example, when a person wants to marry another one, he/she must be a citizen of some country to ask his/her government permission. The government is the entity that regulates other types of relationships to be established by its citizen entities.

FIG. 1 and FIG. 1C depict relationship_prerequisite table 117 that registers prerequisite relationships that are required to exist before the establishment of another type of relationship. This table contains three columns: allowed_relationship_type_id 1C07, prerequisite_relationship_type_id 1C08, and prerequisite_entity_must_approve 1C09.

Column allowed_relationship_type_id 1C07 is a foreign key that links to table allowed_relationship_type 110.

Column prerequisite_relatioship_type_id 1C08 is a foreign key that links to table relationship_type 111, and represents the type of relationship that must be established before this relationship_type is established.

Column prerequisite_entity_must_approve 1C09 represents a flag that shows if the host entity that is related through the prerequisite relationship must approve the establishment of this relationship.

When there is legal guardians or delegated entities representing an entity, a voting process occurs.

FIG. 1 and FIG. 1C depict relationship_voting_process_rules table 120 that registers the minimum vote weight that has to be achieved in order to approve the establishment of a relationship by delegated entities or legal guardian entities.

This table contains three columns: relationship_type_id 1C15, delegate_entity_id 1C16, minimum_weight_for_approval 1C17, and guarded_entity_id 1C18.

Column relationship_type_id 1C15 is a foreign key that links to table relationship_type 111, and represents the type of the delegated_relationship.

Column delegate_entity_id 1C16 is a foreign key that links to table entity 101, and represents the entity that delegates power to another entity to establish this type of relationship.

Column minimum_weight_for_approval 1C17 represents the minimum weight value that has to be achieved to approve the establishment of this type of relationship by delegated entities.

Column guarded_entity_id 1C18 is a foreign key that links to table entity 101, and represents the guarded_entity when the rule defines a Legal Guardian voting process.

FIG. 1 and FIG. 1C depict relationship_approval table 119 that registers votes during voting approval process. This table contains five columns: entity_id 1C10, relationship_id 1C11, entity_vote_weight 1C12, approved 1C13, and voting_date 1C14.

Column entity_id 1C10 is a foreign key that links to table entity 101, and represents the entity that voted.

Column relationship_id 1C11 is a foreign key that links to table relationship 102, and represents the relationship under approval by voting process.

Column entity_vote_weight 1C12 represents the vote weight of this voting entity.

Column approved 1C13 represents a flag that shows if the vote was in favor or against the approval.

Column voting_date 1C14 represents the date of the vote.

FIG. 4 displays a relationship approval process.

When an Entity A wishes to establish a relationship it is allowed to establish to Entity B, Entity A may create a relationship request that could be implemented through a web interface, email or any other type of communication possible between its user device and U.R. System servers 206.

After U.R. System servers performs the relationship request creation process 401, it then verifies the existence of a Legal guardian relationship where Entity A is a guest through the legal guardian verification process 402. If so, the Legal guardian of entity A is notified about the relationship entity A is willing to establish. This notification may be implemented on many ways encompassing web interface, sms, email, or any other way to notify Entity A.

Then Legal guardian approval process 403 is initiated. This process is shown in FIG. 7.

After the approval by the Legal guardian of Entity A, the U.R. System Servers 206 verifies if there is any Legal guardian entity for Entity B through the legal guardian verification process 402. If so, then the same approval process 403 is done for the Legal guardian of Entity B.

After the approval by existent legal guardians, Entity B is notified and asked for approval of the relationship Entity A is requesting through the guest entity approval process 404.

If Entity B approves the relationship, the relationship is established through a relationship establishment process 405 and all information marked to be shared generated by Entity A and Entity B are shared between each other with read access only.

If there is not an approval for the relationship by any Legal guardian or by Entity B itself, the request is denied through a request denial process 406.

The Legal Guardian notification and approval process is shown in FIG. 7. After Legal Guardian Notification 601 via e-mail, sms, or any other kind of communication, the approval process is started. An Entity may have more than one legal guardian and their approval process could be establish through voting. After vote receiving and storing 602, votes are summed 603 and verified for approval 604. If approved, the relationship is allowed to be established 405. If not approved, and the voting process still allows an approval, the system waits for more votes, going back to vote receiving and storing process 602. If not approved and the remaining votes are not enough to approve, the relationship is denied 406.

At FIG. 1 one can see the main columns and tables that support the described processes at table relationship 102 columns request_sent_date, request_denial_date, relationship_start, relationship_end, and relationship_status_id; at table relationship_approval_votes 119 columns entity_vote_weight, approved flag, voting_date; at table relationship_voting_rules 120 columns minimum_weight_for_approval, relationship_type_id, and guarded_entity, at table delegated_entity_empowerment 121 columns delegate_entity_id, delegated_entity_id, delegated_relationship_type_id, vote_weight, delegation_relationship_id.

DETAILED DESCRIPTION

Relationship Establishment with Prerequisite

The flowchart shown in FIG. 5 describes this relationship approval process when a prerequisite is required.

The first stage is a verification for the required prerequisite relationship existence through the prerequisite relationship verification process 501. This may be a simple search in the database for the existence of the prerequisite relationships of a relationship that an Entity A is willing to request. This search is done by the U.R. System servers in its own database.

If a prerequisite relationship is required and is not found the user device is notified that a request for that relationship is not allowed due the lack of the existence of the prerequisite relationship through entity-cannot-request-this-relationship process 502.

If the prerequisite relationship exists, the user device is allowed to proceed with the creation of the relationship request through the relationship request creation process 401.

After creating the relationship request, the U.R. System verifies if Entity A is a guest in a Legal guardian relationship through the legal guardian verification process 402 because if it exists the Legal guardian of Entity A should be notified to approve the relationship request issued by Entity A through Legal Guardian approval process 403. FIG. 7 shows the Legal guardian approval process, as described previously on Operation—Approval Process section.

Returning to FIG. 5, after the relationship request approval by the Legal guardian of Entity A, the system verifies if the regulator entity has to approve the relationship 503. The regulator entity is the Host entity present in the established prerequisite relationship.

If the approval by the regulator entity is necessary 503, its approval is verified by process does-prerequisite-related-entity-approves-this-relationship process 504. If it is not necessary or the regulator entity approved this relationship, the U.R. System proceeds performing the verification of the existence of a Legal guardian responsible for Entity B through the legal guardian verification process 402.

If there is a Legal guardian for Entity B it must be notified for its approval through the legal guardian approval process 403. The same process executed for the Legal guardian of Entity A is now performed for the Legal guardian of Entity B.

Finally the Entity B is notified to approve the relationship request through the guest entity approval process 404.

If Entity B approves the relationship then both entities can issue information related to this relationship and give or not read access to other entities. This related information may be issued, updated, or deleted at any time only by its creator entity.

If the relationship request is denied by any Legal entity, regulator entity, or entity B itself, the request approval may by denied through request denial process 406 and ended.

At FIG. 1 one can see the main columns and tables that support the described processes at table relationship 102 columns request_sent_date, request_denial_date, relationship_start, relationship_end, and relationship_status_id; at table relationship_approval_votes 119 columns entity_vote_weight, approved flag, voting_date; at table relationship_voting_rules 120 columns minimum_weight_for_approval, relationship_type_id, and guarded_entity_id, at table delegated_entity_empowerment 121 columns delegate_entity_id, delegated_entity_id, delegated_relationship_type_id, vote_weight, delegation_relationship_id; at table relationship_prerequisite 117 columns allowed_relationship_type_id, prerequisite_relationship_type_id, and prerequisite_entity_must_approve.

The system allows the establishment of different vote weights for each type of relationship and each delegated or legal guardian entity. This flexible voting rules allows different combinations for decision making processes.

FIG. 6 depicts a flowchart that represents a possible implementation of a relationship approval process by voting performed by delegated entities. This process is executed for every relationship requested to/by the delegate entity, and includes an entity notification process 601, a voting and storing process 602, a vote counting process 603, a vote approval verification process 604, an approval viability verification process 605, the relationship establishment process 405, the request denial process 406, and a delegate approval verification process 606 and a delegate denial verification process 607.

FIG. 7 depicts a flowchart that represents a possible implementation of a voting process performed by legal guardian entities for a relationship approval process. This process is executed for every relationship requested to/by the entity represented by the legal guardian, and includes an entity notification process 601, the voting storage process 602, the vote counting process 603, a vote approval verification process 604, an approval viability verification process 605, the relationship establishment process 405, the request denial process 406.

DETAILED DESCRIPTION

Defining Allowed Relationships

An entity is allowed or not to request the establishment of a relationship with another entity. The definition of which entities can request and which entities can be requested, may be done in this sample database through the population of the tables allowed_relationship_type 110, request_to_entity_type 116, and relationship_prerequisite 117 all shown in FIG. 1.

By example I show in FIG. 1A and FIG. 1C a sample population of these tables where one can see that a Citizenship relationship can be requested by a Government entity_type. This is represented through the record which column id 1C01 has the value 19. The column relationship_type_id 1C02 is a foreign key that links to table relationship_type 111 as shown in FIG. 1 and the sample population of table 111 relationship_type depicted in FIG. 1A shows that a value of 3 on the record on column id 1A03 is defined as Citizenship by name 1A04 and the entity that receives a relationship request must approve its establishment as showed by column must_be_approved 1A05 populated with value TRUE.

The entity types that can be invited to a relationship are defined by the records in the table request_to_entity_type 116. By example at FIG. 1C only one record has a value of 25 in column allowed_relationship_type_id 1C05, and has a value of 3 in entity_type_id 1C06, that defines that only entities of type Government can be invited to this type of relationship. The column entity_type_id 1C06 is a foreign key to the column id 1A01 on table entity_type 109 as show in FIG. 1 and FIG. 1A.

An established relationship may allow the establishment of other types of relationships. This is done through the population of the table relationship_prerequisite 117 at FIGS. 1 and 1C. Column allowed_relationship_type_id 1C07 defines the types of relationship that can be established after the establishment of another relationship defined in column prerequisite_relationship_type_id 1C08, and is also defined if the host entity of prerequisite_relationship_type must approve this request.

DETAILED DESCRIPTION

Information Sharing

An Entity may share any information it owns or it is allowed to share. In order to make this process easier this System allows an Entity to group information that it wishes to share in different Access Classes.

There is two types of access class: a public and a private access class. The Public access class will give read access to any entity that asks for the information it holds, despite the existence of any relationship between both entities. The Public access class may or may not hold information but cannot be deleted. The fact that an entity may chose not to share any information guarantees the right to privacy.

An Entity may create as many Private access classes it wishes to. For example, an Entity may create different access classes such as Family contacts, that could hold contact information to be shared only with its own family, or Professional data, that could give read access to its educational background and professional information, and so on.

FIG. 1 and FIG. 1D depict entity_access_class table 106 that relates entity to access classes. This table contains three columns: owner_entity_id 1D01, related_entity_id 1D02, and access_class_id 1D03.

Column owner_entity_id 1D01 is a foreign key that links to table entity 101 and represents the entity that is relating the information it wishes to share to its related entities.

Column related_entity_id 1D02 is a foreign key that links to table entity 101 and represents the related entity that is being granted an access class.

Column access_class_id 1D03 is a foreign key that links to table access class 107 and represents the access class granted to this related entity.

FIG. 1 and FIG. 1D depict access_class table 107 that represents access classes to information. An entity may define many different access classes, sharing different set of information to different set of related entities. This table contains three columns: id 1D07, name 1D08, and owner_entity_id 1D09.

Column id 1D07 is a primary key.

Column name 1D08 describes an access_class, such as public, private, business, family, etc.

Column owner_entity_id 1D09 is a foreign key that links to table entity 101 and represents the entity that created this access class.

FIG. 1 and FIG. 1D depict access_class_information table 108 that links a set of information to an access class. This table contains three columns: access_class_id 1D04, information_id 1D05, and owner_entity_id 1D06.

Column access_class_id 1D04 is a foreign key that links to table access_class 107 and represents the access class that is being given read access to this information.

Column information_id 1D05 is a foreign key that links to table information 103 and represents the information that is being given read access.

Column owner_entity_id 1D06 is a foreign key that links to table entity 101 and represents the entity that has granted read access to this information for this access_class.

FIG. 1H depicts view related entity vs. access_class 1H14 that shows sample of access class granted by an entity to related entities. This view includes three columns: entity_name 1H01, access_class 1H02, and related_entity 1H03.

Column entity_name 1H01 represents the name of the entity that is granting access to this related entity.

Column access_class 1H02 represents the access class that is associated to this related entity.

Column related_entity 1H03 represents the name of this related entity, associated to this access class.

FIG. 1H also depicts view shared relationship information vs. provided entity 1H15 that shows sample information shared by a provider entity with this related entity through their established relationship. This view includes six columns: entity_name 1H04, relationship 1H05, info_type 1H06, info_value 1H07, related_entity 1H08, and information_provider_entity 1H09.

Column entity_name 1H04 represents an entity name.

Column relationship 1H05 represents an established relationship name.

Column info_type 1H06 represents the type of information issued by this provider entity through this relationship.

Column info_value 1H07 represents the information issued by this provider entity through this relationship.

Column related_entity 1H08 represents the name of the related entity.

Column information_provider_entity 1H09 represents the name of the information provider entity.

FIG. 1H also depicts view shared information vs. access_class 1H16 that shows the information set shared by an entity to its related entities through different access classes. This view includes four columns: entity_name 1H10, access_class 1H11, information_type 1H12, and information 1H13.

Column entity_name 1H10 represents an entity name.

Column access_class 1H11 represents an access class.

Column information_type 1H12 represents the type of information shared through this access class.

Column information 1H13 represents the information shared through this access class.

DETAILED DESCRIPTION

System Access

As shown in FIG. 2 a device user 203 can have access through the internet 201 to the U.R. System network 205 that contains U.R. Servers 206.

U.R. Servers 206 represent a set of computers that are able to perform all network related operations such as firewall, routing, data base, backup, web services, etc. and also operations related to U.R. System described in this embodiment.

FIG. 2 also shows that other network servers 207 can also access U.R. Servers 206 through the Internet 201.

Another alternative to access the system is presented in FIG. 2 showing a user 202 operating his/her user device 203.

This way one can see that U.R. Servers 206 can be reached through computer networks such as the Internet 201, and can be accessed by network computers 207 or user devices 203 being operated or not for their users 202.

DETAILED DESCRIPTION

U.R. System Logon Process

FIG. 3 depicts a User device 203 session Logon process that validates the session logon request 301 informed by the User 201. FIG. 3 shows that a network server 207 may perform the same procedure as a user device 203 does.

All communication between User device 203 and the U.R. System servers 206 may be encrypted through the use of public-key cryptography.

The logon request 301 may carry any kind of credential associated to the Entity encompassing user/password, biometric data, RSA keys, etc.

The logon request 301 can be implemented as a single message that carries any credential provided by the User device 203 to the U.R. System servers 206, or a dialog that for example also implements cryptography to improve security on the transmission of the session logon request 301.

The Session Information returned by U.R. Servers 206 in the session logon response 302 may contain a Session ID and a temporary asymmetric private key generated for this specific session being established; this Session Information is sent to the User device 203 if the session logon request 301 is accepted by the U.R. System Servers 206, or session logon response 302 should inform logon process failure.

The User 201 can store at his/her User Device 203 Entity identification credentials allowing the establishment of sessions without intervention. Network servers 207 may have stored entity identification credentials allowing it to establish sessions without user intervention.

The User device 203 may locally create a local record such as a HTTP session id cookie containing the Session ID of the established session. The User device 203 could store in volatile memory the temporary asymmetric private key it received in session logon response message 302.

A keep alive message can be sent by the User device 203 to the U.R. system servers 206 on a regular time period to keep the session active. If this keep alive message is not received by U.R. system servers 206, the session is terminated and session related information preserved.

A network server 207 may send keep alive messages also, acting the same way described for user device 203.

Once the network server 207 session is established, it may be used as a single sign on process for other systems. Network servers 207 having its own session established, may ask U.R. System servers 206 for information about other users encompassing active sessions, type of credential used by users to logon, user's shared information, etc.

To support this process, the main tables and columns displayed at FIG. 1 are: table entity 101 column Id; table credential 104 columns entity_id, credential, credential_type_id; table credential_type 105 columns id, and name; table session 118 columns session_id, expiration_date_time, entity_id, public_key and credential_type_id.

FIG. 1 and FIG. 1E depict credential table 104 that registers credentials for entity identity validation. It may hold credentials with different security levels, such as login/password, biometrics, etc. This table contains four columns: id 1E03, entity_id 1E04, credential 1E05, and credential_type_id 1E06.

Column id 1E03 is the primary key.

Column entity_id 1E04 is a foreign key that links to table entity 101, and represents the entity that has its identity validated through this credential.

Column credential 1E05 represents the credential itself.

Column credential_type_id 1E06 is a foreign key that links to table credential type table 105, and represents the type of the credential.

FIG. 1 and FIG. 1A depict credential_type table 105 that registers credential types for entity identity validation. This table contains two columns: id 1A06, and name 1A07.

Column id 1A06 is the primary key.

Column name 1A07 describes the name of the type of the credential.

FIG. 1 and FIG. 1G depict session table 118 that registers entity active sessions with the system. This table contains five columns: session_id 1G01, expiration_datetime 1G02, entity_id 1G03, public_key 1G04, and credential_type_id 1G05.

Column session_id 1G01 represents a unique code that is generated exclusively for this session during session establishment.

Column expiration_datetime 1G02 represents the date and time this session will be extinguished by timeout.

Column entity_id 1G03 is a foreign key that links to table entity 101, and represents the entity that is authenticated for this session.

Column public_key 1G04 represents a public key dynamically generated for this session, through which the communication between the user device and U.R. servers will be established.

Column credential_type_id 1G05 is a foreign key that links to table credential_type 105, and represents the type of credential used to authenticate the entity identity in this session.

DETAILED DESCRIPTION

Web Server Guest U.R. Session Validation

A U.R. Session validation process can be easily implemented to be used transparently with any Network service. FIG. 8 depicts one possible implementation of the HTTP Guest U.R. session validation process.

The network server 207 that has a previously established U.R. session with the U.R. Servers 206 verifies the legitimacy of a U.R. established session between User device 203 and U.R. Servers 206. In this case the network server 207 represents a HTTP server.

This process allows the HTTP server 207 to validate the established U.R. session the User device 203 claims to have.

When a HTTP server 207 receives a HTTP service request 801 that contains a HTTP U.R. session cookie sent by the User device 203, it sends a U.R. Session verification message 802 to U.R. Servers 206 that verifies it existence and answers with an U.R. Session verification message answer 803.

This U.R. Session verification message answer 803 contains a cookie with an encrypted random token generated by U.R. Server 206 and encrypted using the public-key generated for the active U.R. Session with User device 203.

The HTTP Server 207 can then answer the HTTP service request 801 by sending a HTTP answer 804 that contains a cookie that carries the encrypted random token received in the answer U.R. Session verification message 803.

The user device 203 then decrypts the token received in the HTTP answer 804 and sends another HTTP service request 805 to inform the decrypted token to the HTTP server 207. The HTTP server 207 sends the decrypted token to U.R. Servers 206 with a token validation message 806 that verifies if tokens sent and received match, and answers with a token validation answer 807. Having the Session legitimacy been verified, the new HTTP request 805 can be answered properly on HTTP answer 808. The HTTP answer 808 may carry a session cookie generated by the HTTP Server 207 that may prevent it from running the U.R. Session verification again for the legitimated U.R. Session.

If HTTP server 207 receives a negative answer in U.R. Session verification message 803 or token validation answer 807 it can decide not to provide the requested service to the user device 203 by presenting a page that explains that a valid session with U.R. Servers 206 must be established to get served.

If HTTP service request 801 does not have a HTTP U.R. session cookie in it, the HTTP server 207 can decide on providing or not the requested service. If HTTP server 207 decides to serve the request, the normal operation of Internet web services is preserved.

DETAILED DESCRIPTION

Anti-Spam

FIG. 9 depicts a possible implementation of an Anti-SPAM process. It shows how a receiver Network Server 207 is contacted by a sender Network Server 207 to receive an email 901. The receiver network server 207 will validate with U.R. System servers 206 if the email may or may not be accepted for delivering 902. U.R. System will check if the recipient has shared his e-mail address with the sender. U.R. System will answer the receiver network server 207 with a message 903. So, the receiver network server 207 may inform sender network server 207 through message 904 if the e-mail will be accepted or denied.

It is also shown how a Network Server 207 serving Email Service for a User device 203 could validate with U.R. System servers 206 if the email should be accepted for delivery or not. A user device 203 sends an e-mail 905 to be delivered by the network server 207. The network server 207 asks 902 U.R. System servers if the recipient has shared his e-mail address with the sender. U.R. System will answer the network server 207 with a message 903. So, the network server 207 may inform the user device 203 through message 906 if the e-mail will be accepted or denied for delivering.

CONCLUSION

As described above this method and system improves information sharing making possible an entity to access the information shared by its issuer. Since the information shared can only be changed by its issuer we can rely on its truthfulness.

This method and system allows one entity to reveal information about itself by linking the entity who is asking about it directly to the information issued by its issuer, instead of creating and sharing information about itself. For example, I will not tell my phone number, I will share with you the right to read the information my telephone company shared with me, my phone number.

This method and system show one embodiment of this new way of sharing information, instead of generating copies and complex authentications process we may simply share the right to access the original information issued by its issuer.

Making official information easy to circulate unchanged and hardening the task of hiding an identity or lying, this system will reduce crimes both in the Internet and out of it.

Imagine a world where everybody takes responsibility. Imagine a world where we can trust information. Imagine a world where we don't worry about the content, and relations our children have access to through the Internet. This method and system can help us to achieve that.

The invention claimed is:

1. A method to build a computer system composed by client devices and servers programmed to store relationships between entities and permit the sharing of generated information that is official and legitimate only, preventing the generation and sharing of unofficial or illegitimate information, comprising:

(a) said servers are programmed to authenticate and authorize said entities to access said computer system using said client devices;

(b) said servers are programmed to accept and validate credentials sent by said client devices, through a message exchange process, in order to identify an entity solely among said entities;

(c) said credentials must be formed at least by username and password pair in order to identify solely one of said entities;

(d) said servers stores descriptions of types of generated information, types of relationships, and types of entities;

(e) said servers are programmed to store a set of rules that define which said types of entities are allowed to establish which said types of relationships;

(f) said set of rules encompass also the definition of each type of generated information that may be issued by each type of entity in each type of relationship in which said entity is involved;

(g) said types of entities must encompass at least: person, government, and enterprise;

(h) said types of relationships must encompass at least: parental, employment, citizenship, marital, delegation, and legal guardian;

(i) said types of generated information must encompass at least: username, password, date of birth, social security number, nationality, name, birth name, job title;

(j) said servers are programmed to store also information that defines said entities, information that defines said relationships, and said generated information;

(k) said servers are programmed to provide an interface to said client devices that allows said entities, after said authenticate and authorize process, to establish said relationships, store said generated information, maintain said generated information and share said generated information;

(l) said generated information is related to said relationships;

(m) said interface must encompass at least http protocol;

(n) said servers are programmed to allow said generated information can only be modified by its own issuer entity, and said issuer entity may share only read access rights to said generated information to a related entity through said relationships;

(o) said servers are programmed to allow said related entity to share said read access rights to said generated information to a third related entity, through an established relationship between them, by its own desire without need any intervention of said issuer entity;

(p) said servers are programmed to allow said related entity to revoke said read access rights granted to said third related entity;

(q) said servers are programmed to allow said issuer entity to revoke said read access rights granted to said related entity;

(r) said entity using his/her own client device, sends a relationship invitation for the establishment of a said relationship to an invited entity, said invited entity may accept or refuse said relationship invitation;

(s) the delegation relationship type empowers a delegated entity to represent a represented entity in managing its said relationships and said generated information on behalf of said represented entity, each said relationship invitation sent to said represented entity will be redirected to said delegated entity;

(t) the legal guardian relationship type empowers a guardian entity to authorize or not authorize the establishment of said relationships whenever guarded entity is about to establish said relationships, each said relationship invitation sent to said guarded entity must be approved by said guardian entity before being delivered to said guarded entity.

* * * * *